United States Patent
Gintis et al.

(10) Patent No.: US 8,654,654 B2
(45) Date of Patent: Feb. 18, 2014

(54) TRAFFIC DISTRIBUTION CONTROL

(75) Inventors: Noah Gintis, Westlake Village, CA (US); Vinod Joseph, Thousand Oaks, CA (US)

(73) Assignee: Ixia, Calabasas, CA (US)

( * ) Notice: Subject to any disclaimer, the term of this patent is extended or adjusted under 35 U.S.C. 154(b) by 749 days.

(21) Appl. No.: 12/564,851

(22) Filed: Sep. 22, 2009

(65) Prior Publication Data

US 2011/0069622 A1 Mar. 24, 2011

(51) Int. Cl.
*H04L 5/12* (2006.01)

(52) U.S. Cl.
USPC ............ 370/244; 370/250; 370/251; 709/224

(58) Field of Classification Search
USPC .......... 370/242, 250, 251, 252, 244; 709/224, 709/249
See application file for complete search history.

(56) References Cited

U.S. PATENT DOCUMENTS

| | | | |
|---|---|---|---|
| 5,568,471 A | 10/1996 | Hershey et al. | |
| 5,802,073 A * | 9/1998 | Platt .............................. | 714/733 |
| 5,867,483 A | 2/1999 | Ennis | |
| 6,108,800 A | 8/2000 | Asawa | |
| 6,389,532 B1 * | 5/2002 | Gupta et al. .................. | 713/163 |
| 6,526,259 B1 | 2/2003 | Ho | |
| 6,578,077 B1 | 6/2003 | Rakoshitz et al. | |
| 6,717,917 B1 * | 4/2004 | Weissberger et al. ......... | 370/252 |
| 6,816,903 B1 | 11/2004 | Rakoshitz et al. | |
| 6,823,051 B1 | 11/2004 | Thomas et al. | |
| 6,826,259 B2 | 11/2004 | Hoffman | |
| 6,910,061 B2 | 6/2005 | Hu et al. | |
| 7,177,268 B2 | 2/2007 | Shinagawa | |
| 7,304,958 B2 | 12/2007 | Nelson et al. | |
| 7,342,897 B1 * | 3/2008 | Nader et al. ................... | 370/255 |
| 7,515,585 B2 | 4/2009 | Rittmeyer et al. | |
| 7,519,990 B1 * | 4/2009 | Xie ................................. | 726/13 |
| 7,643,431 B2 | 1/2010 | Pepper | |
| 7,680,925 B2 | 3/2010 | Sathyanarayana et al. | |
| 7,760,732 B2 * | 7/2010 | Bhargava et al. ............. | 370/392 |
| 7,769,049 B2 | 8/2010 | Pepper et al. | |
| 7,840,664 B2 | 11/2010 | Dugatkin et al. | |
| 7,881,221 B2 | 2/2011 | Arad et al. | |

(Continued)

FOREIGN PATENT DOCUMENTS

| | | |
|---|---|---|
| EP | 0895375 | 2/1999 |
| EP | 1583279 A2 | 10/2005 |
| JP | 2007-201878 | 8/2007 |
| JP | 2008-131640 | 6/2008 |

OTHER PUBLICATIONS

European Patent Office, European Search Report for European Application No. 10008759.2-2416, Mail Date Oct. 15, 2010, pp. 1-9.

(Continued)

*Primary Examiner* — Awet Haile
(74) *Attorney, Agent, or Firm* — SoCal IP Law Group LLP; Mark A. Goldstein

(57) ABSTRACT

There is disclosed apparatus and processes for generating simulated network test traffic from a stored test traffic definition. A network test system or a user may select arbitrary ways to group flows of test traffic into streams, and to modify these streams before and during transmission of the test traffic by network test equipment.

16 Claims, 2 Drawing Sheets

© 2009 Ixia

(56) References Cited

U.S. PATENT DOCUMENTS

| | | | |
|---|---|---|---|
| 7,895,227 | B1 | 2/2011 | Henderson |
| 7,961,605 | B2 | 6/2011 | Gusat et al. |
| 2002/0013825 | A1* | 1/2002 | Freivald et al. ............... 709/218 |
| 2003/0179777 | A1 | 9/2003 | Denton et al. |
| 2004/0177142 | A1 | 9/2004 | Pepper |
| 2004/0236866 | A1 | 11/2004 | Dugatkin et al. |
| 2006/0190594 | A1* | 8/2006 | Jorgenson et al. ............ 709/224 |
| 2006/0262729 | A1 | 11/2006 | Chau et al. |
| 2007/0025261 | A1 | 2/2007 | Ginsberg et al. |
| 2007/0115833 | A1* | 5/2007 | Pepper et al. ................. 370/241 |
| 2008/0117907 | A1 | 5/2008 | Hein |
| 2008/0219164 | A1 | 9/2008 | Shimonishi |
| 2008/0259806 | A1 | 10/2008 | Jorgenson |
| 2009/0196176 | A1 | 8/2009 | Nishimura |
| 2009/0257354 | A1 | 10/2009 | Hannel et al. |
| 2009/0262743 | A1 | 10/2009 | Uyehara et al. |
| 2009/0310491 | A1 | 12/2009 | Ginsberg et al. |
| 2010/0034100 | A1* | 2/2010 | Beyers ......................... 370/250 |

OTHER PUBLICATIONS

Brownlee, SRL: A Language for Describing Traffic Flows and Specifying Actions for Flow Groups, Network Working Group, The University of Auckland, Oct. 1999, pp. 1-23.

Brownlee et al., Traffic Flow Measurement: Architecture, Network Working Group, The University of Auckland, GTE Laboratories, Inc. and GTE Internetworking, Oct. 1999, pp. 1-49.

Ixia, IxExplorer User's Guide, Revision 2.1.0, Published Nov. 11, 1999.

Ixia, Specifications for Load Modules—Multilayer Gigibit Ethernet for LM1000LX, LM1000SX, LM1000GBIC, LM1000T, Product Specification Sheet.

Ixia, The Ixia 200 Traffic Generator and Analyzer, Product Description, 1997-1999.

Ixia, Ixia 200 Chassis, Product Description.

Agilent Technologies, The Journal of Internet Test Methdologies—Edition 3.1, Sep. 30, 2007, accessed Oct. 1, 2010, http://www.ixiacom.com/pdfs/test_plans/agilent_journal_of_internet_test_methodologies.pdf, index and pp. 4-15 through 4-18 and 8-14 through 8-15.

* cited by examiner

TRAFFIC DISTRIBUTION CONTROL

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generation of simulated network traffic for testing a network, network subset, network device or group of devices.

2. Description of the Related Art

In many types of communications networks, each message to be sent is divided into portions of fixed or variable length. Each portion may be referred to as a packet, a cell, a datagram, a data unit, or other unit of information. These portions may be packaged with a headers into frames, and may be split and repackaged during transmission through the network. All of these variations are referred to herein as packets.

Each packet typically contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. In order to test a packet switched network or a device included in a communications network, it is often desirable to automatically transmit network traffic having a data rate equal to the line rate or maximum possible data rate of the network communication path or device.

A series of packets originating from a single source and having a specific type of packet and a specific rate will be referred to herein as a "stream." A source may be, for example, a port on a network interface card. A source may support multiple outgoing streams simultaneously and concurrently, for example to accommodate multiple packet types or rates. "Simultaneously" means "at exactly the same time." "Concurrently" means "within the same time."

For the purpose of reporting network traffic data, the packets within a stream may be organized into flows, where a "flow" is any plurality of packets for which network traffic statistics are accumulated and reported. The packets in a given flow may be distinguished by a flow identifier contained in each packet. The flow identifier may be a numeric value that may be based on or derived from, for example, an address, a port number, a tag, or some other field or combination of fields within each data unit; may be user defined; or may be based on meta data about the packet.

A plurality of concurrent streams may be combined to form the output from a traffic generator, which will be referred to herein as "test traffic". The streams within the test traffic may be combined through interleaving. The interleaving may be balanced, unbalanced, and distributed among the represented streams. The data rate of the test traffic may be equal to the line rate of a network communication path over which the output is transmitted. To test a modern "triple play" network and network equipment, the test traffic may contain simulated email and other data messaging, data, images, audio, and video streams.

Test traffic may be generated in many different ways. According to one prior art process, a user uses a computer to define the test traffic, and then from the same user interface the user initiates the transmission of the defined test traffic. The test traffic is generated by specialized hardware connected to the user's computer. In this prior art process, the user defines the test traffic by selecting the protocol(s) (e.g., IPv4, IPv6, Frame Relay, ATM) and pairing endpoints. With the protocol and endpoint pairs selected, the process typically next involves the user selecting the frame size and packet rate of each traffic item.

Conceptually, generating test traffic is a simple matter: the user defines the test traffic and then the specialized hardware transmits the traffic. When the amount of traffic to be transmitted is small it can be a simple task. However, in practice this is tremendously complex.

Generating test traffic that realistically simulates a real world environment requires a complex mix of traffic, with ebbs and flows, errors, bursts, etc. The simulation may include hundreds of source and destination endpoints. A testing of carrier-class equipment may involve generating millions or even billions of packets. These packets must be created and transmitted quickly enough that the result looks realistic—for example, like the behavior of an entire large city. For small tests, it may be sufficient to create all of the packets and store them in memory, and then transmit them according to the user's definition. For larger tests, this is practically impossible.

In one prior art traffic generation system, the user is provided with a limited facility for grouping flows of only VLAN test traffic having the same, single source endpoint or the same, single protocol, and nothing else. Furthermore, if any field of the group was to be modified, the prior art system required redoing the selection of protocols, endpoint pairs, frame size and packet rate. It was considered impossible to do anything more because of the complexity and resource requirements of anything but very small tests.

To generate huge volumes of test traffic quickly enough, one prior art solution has been to optimize the specialized hardware specific to different protocols. Another solution has been to create custom data structures that efficiently describe the test traffic. According one of these latter solutions, the test traffic is described as one or more arrays. The array will have fields corresponding to the fields of the packets, plus additional fields corresponding to metadata which the traffic generation system knows about the packets. For example, for IP packets, the fields include source IP address, destination IP address and quality of service. The metadata fields include source endpoint identification and destination endpoint identification.

Having an array with these fields, though, is far from sufficient for anything but small tests. Thus, the values in the array are instead described using a shorthand (i.e., encoded) so that more information can be packed efficiently into limited memory, and the packets generated efficiently with limited processing resources. To accomplish this, software translates the user's test traffic definition into an array of the shorthand-encoded values. According to one prior art shorthand, the values can take the form of either an "array", a "mesh", a "nest", a "counter" or a "limit". Other forms may also be included. The array form is a list of single values, such as 1, 210, 44, 23. The mesh form has a shorthand-encoded value along with a "repeat" value and a "count" value. The repeat value dictates how many times to repeat the set. The count value tells how many times to repeat each member in the set before using the next member in the set. The nest form has two shorthand values, and dictates that one of the shorthand values is nested inside the other. The counter form has a start value, an increment value and a count value. The start value dictates the first value in the set, the increment dictates how to increment each member to the next, and the count value dictates the number of members in the set. The limit form has a shorthand value, a "start" value and an "end" value. With the limit form, the value is a subset of the specified shorthand value starting from the start value and continuing to the end value.

Even though using arrays of shorthand values is helpful for storing test traffic definitions and generating traffic from them, it has not alone made modifying the definitions any less difficult. Especially when dealing with large amounts of traffic (e.g., millions of packets or more), modifying a test traffic definition has been a tedious task, if at all possible.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Figure 1:
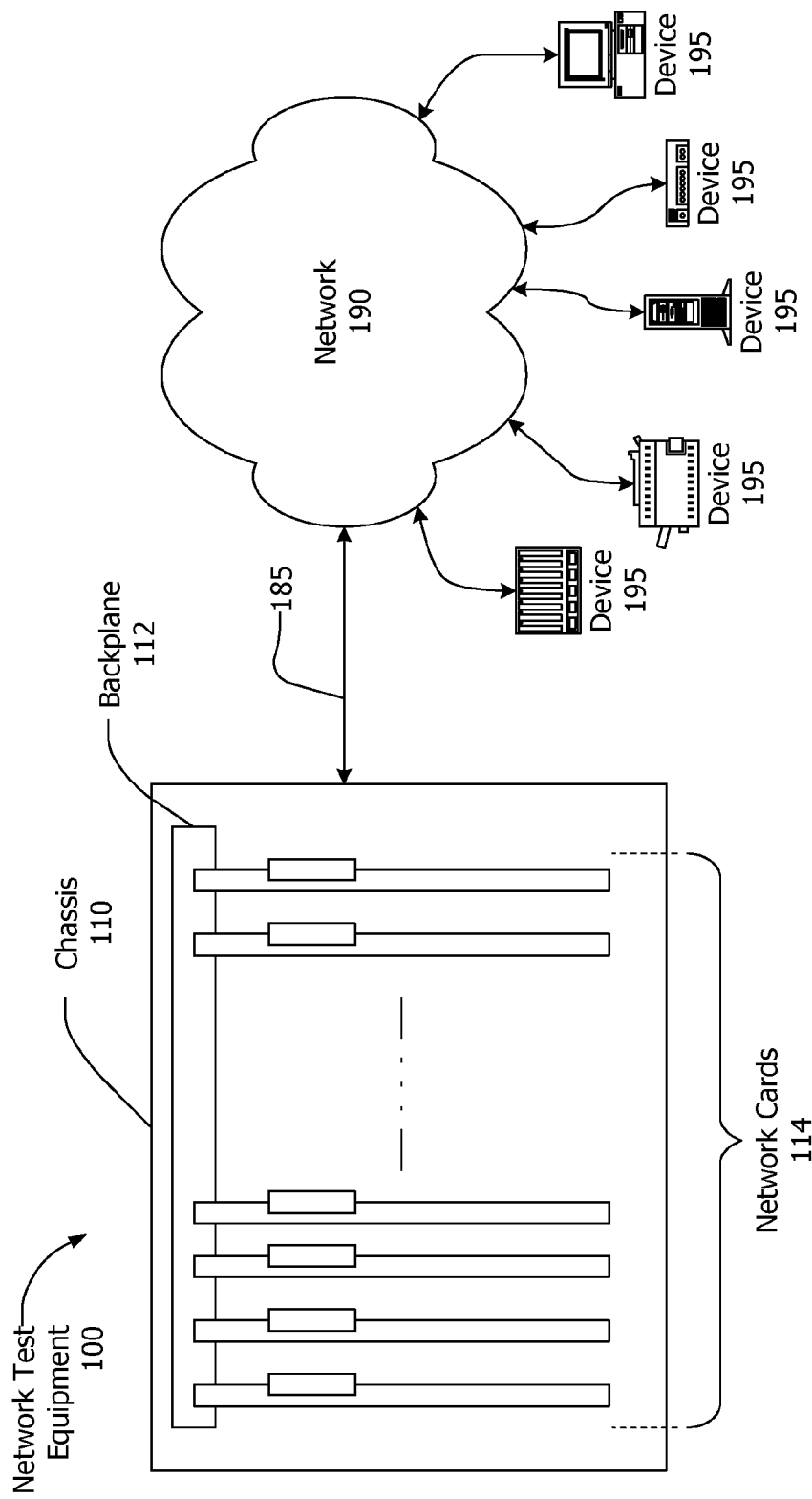
FIG. 1 is a block diagram of a network environment.

Referring now to FIG. 1, there is shown a block diagram of a network environment. The environment may include network test equipment 100, a network 190 and plural network devices 195. The network test equipment 100 may be used to test all or a portion of the network 190 or one or more of the network devices 195. The network test equipment 100 may be referred to as a network test system or traffic generation system.

The network test equipment 100 may be a network testing device, performance analyzer, conformance validation system, network analyzer, or network management system. The network test equipment 100 may include one or more network cards 114 and a backplane 112 contained or enclosed within a chassis 110. The chassis 110 may be a fixed or portable chassis, cabinet, or enclosure suitable to contain the network test equipment. The network test equipment 100 may be an integrated unit, as shown in FIG. 1. Alternatively, the network test equipment 100 may comprise a number of separate units cooperative to provide traffic generation and/or analysis. The network test equipment 100 and the network cards 114 may support one or more well known standards or protocols such as the various Ethernet and Fibre Channel standards, and may support proprietary protocols as well.

The network cards 114 may include one or more field programmable gate arrays (FPGAs), application specific integrated circuits (ASICs), programmable logic devices (PLDs), programmable logic arrays (PLAs), processors and other kinds of devices. In addition, the network cards 114 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards. Each network card 114 may provide one or more network ports. The ports of the network cards 114 may be connected to the network through a communication medium 185, which may be a wire, an optical fiber, a wireless link, or other communication medium. Each network card 114 may support a single communications protocol, may support a number of related protocols, or may support a number of unrelated protocols. The network cards 114 may be permanently installed in the network test equipment 100 or may be removable.

The backplane 112 may serve as a bus or communications medium for the network cards 114. The backplane 112 may also provide power to the network cards 120.

The network devices 195 may be any devices capable of communicating over the network 190. The network devices 195 may be computing devices such as workstations, personal computers, servers, portable computers, personal digital assistants (PDAs), computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, and multiplexers. In addition, the network devices 195 may include appliances, alarm systems, and any other device or system capable of communicating over a network.

The network 190 may be a Local Area Network (LAN), a Wide Area Network (WAN), a Storage Area Network (SAN), wired, wireless, or a combination of these, and may include or be the Internet. The network test equipment 100 and the network devices 195 may communicate simultaneously with one another, and there may be plural logical communications between the network test equipment 100 and a given network device 195. The network itself may be comprised of numerous nodes providing numerous physical and logical paths for data to travel.

One of the network devices 195 such as a PC or other type or client computer may be used by a user to control the network test equipment 100. Alternatively the network test equipment 100 may include hardware and software for a user interface such as an attached client computer. A client computer and the network test equipment, either together or separately, may include software and/or hardware for providing functionality and features described herein. These systems may therefore include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The hardware and firmware components of the network test equipment and client computer may include various specialized units, circuits, software and interfaces for providing the functionality and features described here. The processes, functionality and features may be embodied in whole or in part in software which operates on the network test equipment and/or client computer and may be in the form of firmware, an application program, an applet (e.g., a Java applet), a browser plug-in, a COM object, a dynamic linked library (DLL), a script, one or more subroutines, or an operating system component or service. The hardware and software and their functions may be distributed such that some components are performed by the network test equipment, others by the client computer and others by other devices.

Figure 2:
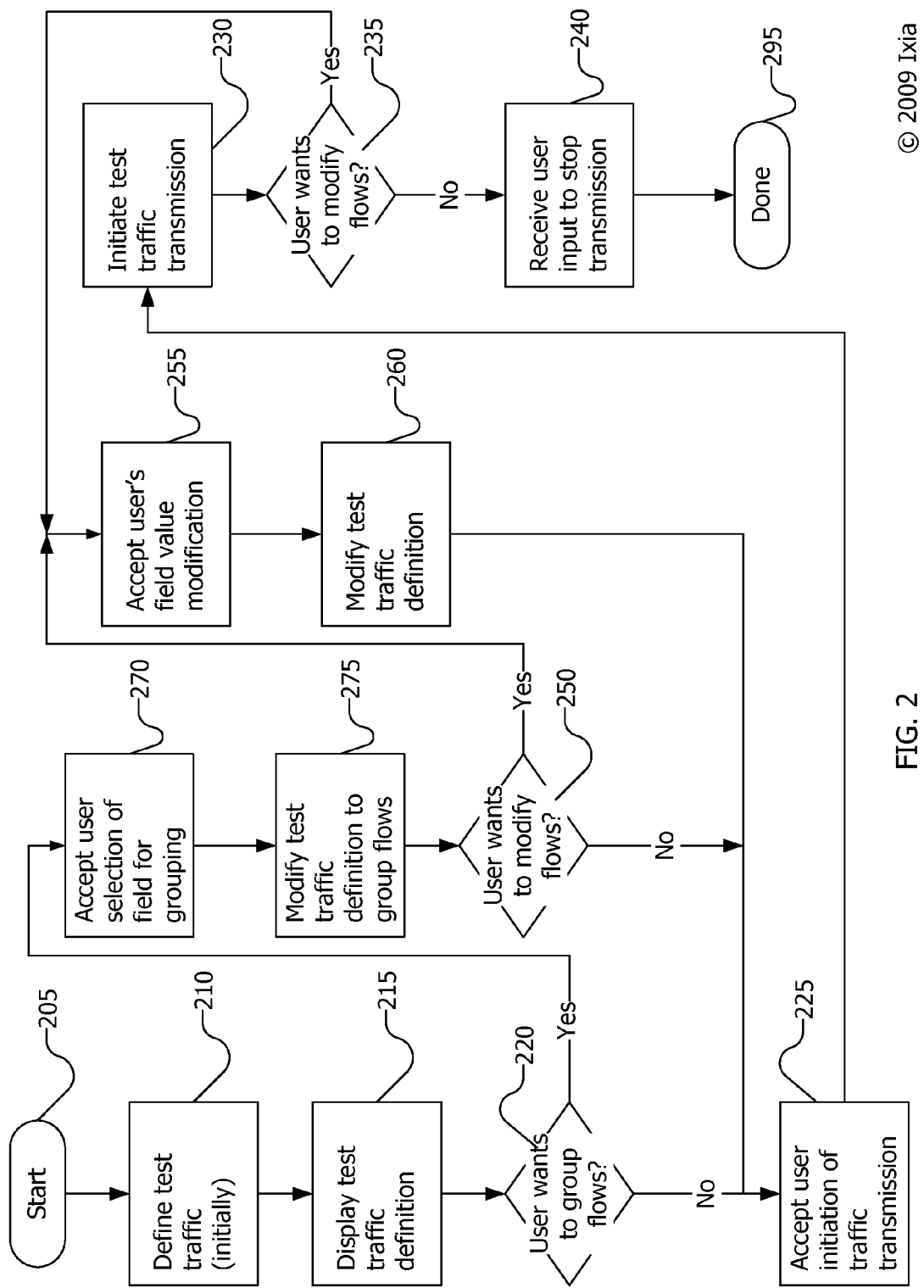
FIG. 2 is a flow chart of a process for generating simulated network test traffic from a stored test traffic definition.

Referring now to FIG. 2 there is shown a flow chart of a process for generating simulated network test traffic from a stored test traffic definition. The process may be performed by and with the environment of FIG. 1, with the user interface provided by the client computer and the test traffic generation by the network test equipment, with the other functionality provided by either the client computer or the network test equipment running appropriate software. In this process, a user is able to select arbitrary ways to group flows of test traffic into streams, and to modify these streams before and during transmitting of the test traffic by the network test equipment 100. The flow chart of FIG. 2 has both a start 205 and an end 295, but the process is cyclical in nature.

The test traffic definition in this process is for transmitting from one to millions or more packets between from one to hundreds or more endpoints pairs. To make the process feasible for large numbers of packets and large numbers of endpoint pairs, the values in the test traffic definition are encoded for compactness, efficient management, and efficient generation of the test traffic. The encoding may be done in the manner described in the Background section above.

After starting, the test traffic may be initially defined 210 to create a test traffic definition. The test traffic definition may be prepared from scratch or loaded from an existing definition, and modified if desired. One or more stored test traffic definitions may be combined. For each packet in the test traffic definition, there are fields of values. The fields both define the data in the packet and information about the packet (i.e., metadata). The data fields may include source endpoint address, destination endpoint address, traffic protocol, rate, frame size, encapsulation type and route endpoints. The traffic protocol values may be industry standards including IPv4, IPv6, Ethernet/VLAN, Frame Relay, ATM, HDLC, PPP, and FcoE. The encapsulation type values may be industry standards including MPLS, VPN, 6PE, BGP-MPLS, and MAC-in-MAC. The metadata fields may include traffic name, source endpoint name and destination endpoint name.

To allow a user to easily modify the test traffic definition, the test traffic definition may be displayed (215). The display may be provided in various views, such as a tree, table or spreadsheet, with tabs to change views. The display may include field values and/or representations of values such as icons or notations. The display may also provide the user with a user interface to group flows of test traffic from the test traffic definition. A group of flows is characterized in that all of the flows have at least one common characteristic, and the grouping is based upon the characteristic. Grouped flows may be displayed to the user in a manner that reflects the grouping. The test traffic definition may be stored in a manner so as to physically keep together those portions of the definition relating to flows of the same group. When the test traffic is transmitted, a group of flows is a stream.

If the user does not opt to group flows (220), then the traffic generation system makes a system default grouping and awaits user initiation of transmission of the test traffic (225). After the user indicates that test traffic transmission should initiate, the network test equipment will initiate transmission of the test traffic (230). To accomplish this, the control application on the client computer may automatically signal to the network test equipment. The signaling may include writing all or part of the test traffic definition to the network test equipment, or writing the test traffic itself. The transmission of the test traffic may continue indefinitely, until completed, or until user input to stop transmission is received (240). The client computer may communicate with the network test equipment to monitor status and progress of the traffic transmission.

If the user opts to group flows (220), the user's selection of at least one field for grouping flows of the test traffic is accepted (270). The user interface for grouping flows may be provided through the same interface provided for display and modification of the test traffic definition. The grouping of flows may be independent of the endpoint address fields and the protocol field. The flows may be grouped by any of the fields in the test traffic definition including or excluding the endpoint address fields. This differentiates flow grouping from typical test traffic management, since it is believed that test traffic definitions have been confined to groups of traffic with the same source endpoint (e.g., route range), destination endpoint, or protocol type. Similarly, if the user does not opt to group flows (220), the traffic generation system may make a system default grouping of flows independent of the endpoint address fields and the protocol field, that is, excluding the endpoint address fields.

With the fields selected, the test traffic definition is automatically modified (275) so that the test traffic is logically grouped into flows in accordance with the user selection. To achieve automatic modification of the test traffic definition quickly enough for practical purposes, an efficient approach is needed, one which can accomplish the modification with practical processing resources.

This approach has two parts, which may be referred to as slice and extract. First, the test traffic definition is sliced according to the selected fields. Slicing is an operation that packages all occurrences of each value of the selected fields into a set of indices. While slicing is conceptually simple, due to the potentially highly complex encoding of values in the test traffic definition, slicing in practice involves decoding some of the encoded values to unwind links between fields with encoded dependencies on other fields' values. Slicing may be achieved by running a reverse lens on interior matches within encoded pattern trees to generate meshed exterior indices that are used to extract values from other fields. The decoded slices may be sorted according to the selected fields. Second, the sorted slices are extracted from the test traffic definition and re-encoded for compactness and efficient generation of the test traffic. The re-encoded slices may be added back to the test traffic definition.

The user may be provided an interface for modifying values of fields in one or more of the flow groups. If the user elects to modify the flows (235), the user is provided a user interface for selecting and modifying the fields (255). The values of any of the fields may be modified, such as rate, frame size, and encapsulation. The modification is automatically performed through re-encoding of values in the test traffic definition (260). When the user is satisfied with the modified test traffic definition, the user may initiate traffic transmission based on the modified traffic definition (235).

When generated, the logical flow groups are configured as one or more streams. The process follows the steps described above—accept user initiation (225), automatically initiate transmission (230), automatically transmit traffic, and receive user input to stop transmission (240).

In addition to the user being allowed to request modification of flows before the test traffic is transmitted, the user may also be provided with a user interface for doing so after transmission of the test traffic has started but before it has completed (235). After the modification is complete, the network test equipment is instructed to transmit the test traffic as modified.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

Within this description, the term "unit" also means a collection of hardware, firmware, and/or software, which may be on a larger scale than an "engine". For example, a unit may contain multiple engines, some of which may perform similar functions in parallel. The terms "engine" and "unit" do not imply any physical separation or demarcation. All or portions of one or more units and/or engines may be collocated on a common card, such as a network card 114, or within a common FPGA, ASIC, or other circuit device.

It is claimed:

1. A process for generating simulated network test traffic from a stored test traffic definition, wherein the test traffic definition is for generating packets between one or more endpoint pairs, the process comprising:
encoding the values in the test traffic definition,
wherein the test traffic definition includes for each packet plural fields of data values to be included in the packet and plural fields of metadata values about the packet,
wherein the data fields include source endpoint address, destination endpoint address and traffic protocol;
grouping the test traffic into flows according to a user selection of at least one field for grouping the test traffic into flows, the grouping achieved independent of the endpoint address fields;
automatically modifying the test traffic definition so that the test traffic is logically grouped into flows in accordance with the user selection and configured as streams, wherein the automatically modifying the test traffic definition includes:
slicing the test traffic definition according to the selected fields, including packaging occurrences of each value of the selected fields into a set of indices and decoding some of the encoded values to unwind links between fields with encoded dependencies on other field values;
sorting the slices according to the selected fields;
extracting the sorted test traffic definition;
re-encoding for compactness and efficient generation of the test traffic; and
signaling to network test equipment to transmit the test traffic as the configured streams.

2. The process of claim 1 further comprising
receiving a user modification request specifying at least one of rate, frame size, and encapsulation of at least one flow group;
modifying the test traffic of the flow group in accordance with the user request.

3. The process of claim 2 wherein receiving a user modification request occurs before the test traffic is transmitted.

4. The process of claim 2 wherein receiving the user modification request occurs after transmission of the test traffic has started, the process including signaling to the network test equipment to transit the test traffic as modified.

5. The process of claim 1 wherein the fields of data include rate, frame size and encapsulation type, and the fields of metadata include traffic name, source endpoint name and destination endpoint name.

6. The process of claim 5 wherein the fields of data further include route endpoints.

7. The process of claim 5 wherein the encapsulation type values are industry standards including MPLS, VPN, 6PE, BGP-VPLS, and MAC-in-MAC.

8. The process of claim 1 wherein the traffic protocol values are industry standards including at least one of IP v4, IP v6, Ethernet/VLAN, Frame Relay, ATM, HDLC, PPP, and FcoE.

9. A network test system for generating simulated network test traffic from a stored test traffic definition, wherein the test traffic definition is for generating a plurality of packets between a plurality of endpoint pairs, the network test system comprising:
a user input device;
a display device;
a processor;
a memory;
wherein the processor and the memory comprise circuits and software for: encoding, values in the test traffic definition;
wherein the test traffic definition includes for each packet plural fields of data values to be included in the packet and plural fields of metadata values about the packet,
wherein the data fields include source endpoint address, destination endpoint address and traffic protocol;
receiving a user selection of at least one field for grouping flows of the test traffic, the grouping independent of the endpoint address fields and the protocol field;
automatically modifying the test traffic definition so that the test traffic is logically grouped into flows in accordance with the user selection and configured as streams, wherein the automatically modifying the test traffic definition includes:
slicing the test traffic definition according to the selected fields, including packaging occurrences of each value of the selected fields into a set of indices and decoding some of the encoded values to unwind links between fields with encoded dependencies on other field values;

sorting the slices according to the selected fields, extracting the sorted test traffic definition, re-encoding for compactness and efficient generation of the test traffic; and causing the test traffic to be transmitted as the configured streams.

10. The apparatus of claim 9, the circuits and software further for receiving a user request of modification of at least one of rate, frame size, and encapsulation of at least one flow group;

automatically modifying the test traffic of the flow group in accordance with the user request.

11. The apparatus of claim 9 wherein the fields of data include rate, frame size and encapsulation type, and the fields of metadata include traffic name, source endpoint name and destination endpoint name.

12. The apparatus of claim 9 including a network test equipment and a client computer.

13. Apparatus comprising a non-transitory storage medium storing a network testing program having instructions which when executed by a processor cause a network test system to generate simulated network test traffic from a stored test traffic definition, wherein the test traffic definition is for generating a plurality of packets between one or more endpoint pairs, the instructions of the network testing program for:

encoding the values in the test traffic definition, wherein the test traffic definition includes for each packet plural fields of data values to be included in the packet and plural fields of metadata values about the packet, wherein the data fields include source endpoint address, destination endpoint address and traffic protocol;

receiving a user selection of at least one field for grouping flows of the test traffic, the grouping independent of the endpoint address fields and the protocol field;

automatically modifying the test traffic definition so that the test traffic is logically grouped into flows in accordance with the user selection and configured as streams, wherein the automatically modifying the test traffic definition includes:

slicing the test traffic definition according to the selected fields, including packaging occurrences of each value of the selected fields into a set of indices and decoding some of the encoded values to unwind links between fields with encoded dependencies on other field values;

sorting the slices according to the selected fields, extracting the sorted test traffic definition, re-encoding for compactness and efficient generation of the test traffic; and causing the test traffic to be transmitted as the configured streams.

14. The apparatus of claim 13, the instructions further for receiving a user request of modification of at least one of rate, frame size, and encapsulation of at least one flow group;

automatically modifying the test traffic of the flow group in accordance with the user request.

15. The apparatus of claim 13 wherein the fields of data include rate, frame size and encapsulation type, and the fields of metadata include traffic name, source endpoint name and destination endpoint name.

16. The apparatus of claim 13 comprising the network test system.

* * * * *